March 3, 1942.           S. GARGIULE ET AL           2,275,359
                         LAWN MOWER ATTACHMENT
                         Filed Oct. 28, 1940
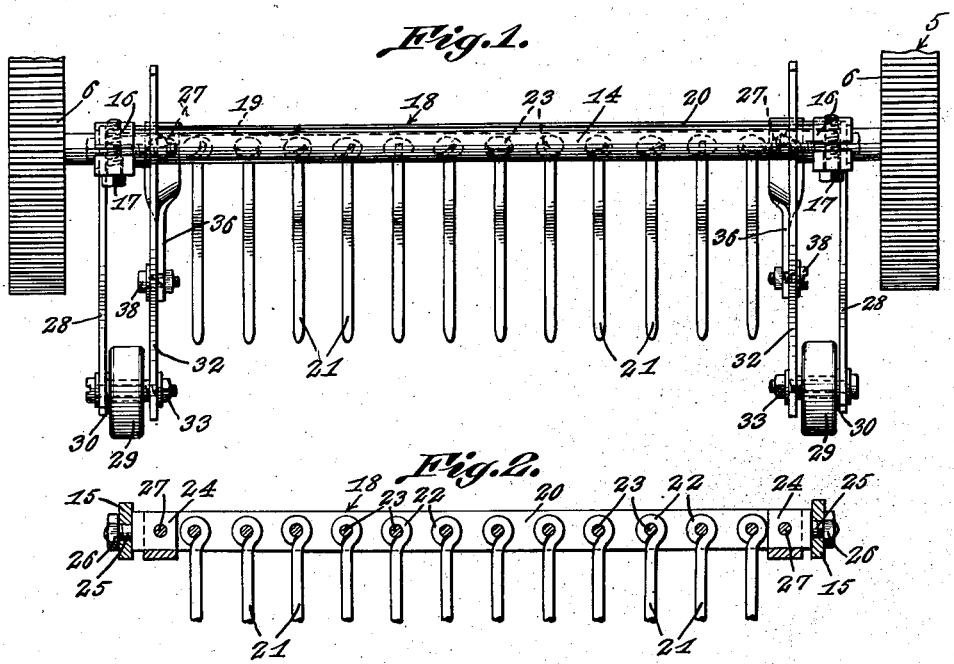
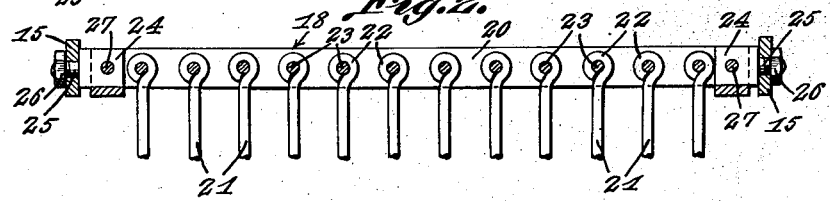
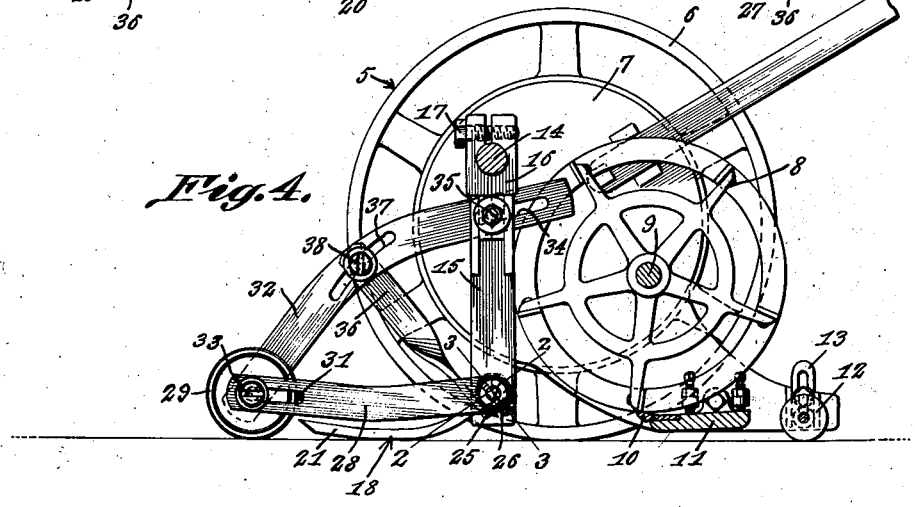
Samuel Gargiule
Frank Taranta, INVENTORS
BY Victor J. Evans & Co.
ATTORNEYS Patented Mar. 3, 1942

2,275,359

UNITED STATES PATENT OFFICE 2,275,359

LAWN MOWER ATTACHMENT

Samuel Gargiule and Frank Taranta, Plainfield, N. J.

Application October 28, 1940, Serial No. 363,214

2 Claims. (Cl. 56—249)

The present invention relates to attachments for lawn mowers and similar devices and has for its primary object the provision of a device in the form of a rake travelling in advance of the cutting mechanism for raising crab grass and similar undesirable growth which normally lies close to the ground, whereby the same will be severed by the cutting mechanism to aid in substantially eliminating such undesirable growth.

A further object of the invention resides in the provision of a device of the above character which is readily adaptable to the various types of lawn mowers and which contains adjusting means for rendering the attachment readily adaptable to various forms of mowers.

A still further object of the invention is to provide a grass raising attachment for lawn mowers which is simple in construction, relatively inexpensive to manufacture and which will carry out the above outlined purposes.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a top plan view of the attachment embodying the features of the present invention.

Figure 2 is a detail sectional view taken substantially on line 2—2 of Figure 4.

Figure 3 is a detail sectional view taken substantially on line 3—3 of Figure 4.

Figure 4 is an end view of the attachment illustrating its relative position with a lawn mower, parts of the lawn mower being shown in section.

Referring to the drawing for a more detailed description thereof, a lawn mower of conventional construction is generally designated by the reference numeral 5 which includes wheels 6, gear casing element 7, a rotary cutter 8 mounted on a shaft 9 driven by said gear elements. A stationary blade 10 cooperates with the rotary cutter 8, the same being adjustably carried by the bar 11. Adjustment of the rotary cutter 8 is obtained through the roller 12 which is adjustably mounted in brackets 13 in a manner well known in the art. The parts above described are of conventional construction and form no part of the present invention.

A tie bar 14, which is also a conventional part of a lawn mower, rigidly connects the gear casing 7 and forms the means for supporting the attachment. Vertically disposed brackets 15 are carried on opposed ends of the bar 14, the upper ends of said brackets being formed with caps 16 held in clamping relation around the bar by means of stud bolts or the like 17. A rake-like structure generally designated by the reference numeral 18 is supported between the brackets 15 and attached to the lower end thereof whereby said rake-like construction will travel in advance of the rotary cutter 8. As more particularly shown in Figures 2 and 3 of the drawing, the rake-like construction comprises parallel disposed bars 19 and 20, respectively, which support therebetween in spaced relation a plurality of substantially horizontally disposed rake teeth 21, eyes 22 formed on one end thereof held between the bars 19 and 20 and fixedly secured therebetween by means of the bolt and nut fasteners 23. A plate 24 held between the bars 19 and 20 at each end thereof forms the means of attaching said plates to the lower end of the brackets 15, each of said plates having a threaded end 25 disposed through aligned openings formed in said brackets to which is attached a nut 26. The plates 24 are held securely between the bars 19 and 20 by means of the rivets 27, the arrangement of which permits the construction 18 to be adjusted in a manner to be hereinafter described so that the front ends of the teeth 21 may be raised or lowered relative to the ground with the plates 24 and threaded ends 25 serving as a pivot.

A pair of forwardly extending arms 28 are mounted on the lower ends of the brackets 15 and support on their free ends ground-engaging wheels 29, said wheels being suitably journalled in bearings 30 mounted in the elongated slots 31. Extending from the inner face of the wheels 29 and adjustably attached intermediate the ends of the brackets 15 are a pair of arcuate-shaped arms 32. The arms 32 are held on shafts of the wheels by means of the nuts 33 and the other end of said arms are formed with a slot 34 by which the same are adjustably secured to the brackets 15 by means of a nut and bolt connection 35. Movement of the arms 32 through the limit of the slot 34 will raise and lower the wheels 29.

Adjustment of the rake construction is accomplished by means of the levers 36 held by means of the rivets 27 to the lower face of the plate 20, the other end of said levers being held in an arcuate slot 37 formed intermediate the ends of each of the curved arms 32 and held therein by means of the bolt and nut connection 38. The bars 19 and 20 can be swung on their pivots for adjusting the position of the teeth 21 by raising or lowering the levers 36 in the slots 37 and occasional adjustments may be required depending upon the type of grass sought to be eliminated. In other words, in some instances it may be necessary to adjust the teeth so that they are in contactual engagement with the ground while in other instances the teeth may be raised therefrom sufficiently to pick up the grass so that it can be severed by the cutting blades of the mower. The adjustment of the arcuate-shaped arms 32 may be necessary when adapting the attachment to various types of lawn mowers but it is preferred that the wheels 29, which travel in front of the teeth 21, be in engagement with the ground at all times. It will be observed that the arcuate-shaped arms 32 and horizontally disposed arms 23 are each bolted to the vertical brackets 15 and wheels 29.

The attachment is capable of being readily applied to and removed from various types of lawn mowers with a minimum amount of time and effort and when in position affords an effective means in the form of a rake travelling in advance of the cutting mechanism so as to disturb or raise up undesirable growth which spreads and lies close to the ground, whereby such growth will be severed by the cutting mechanism.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In an attachment for a lawn mower, a pair of depending brackets secured to the end portions of the cross bar of the mower, a tooth supporting member connected to and extending between the lower ends of the said brackets, a plurality of teeth secured and projecting forwardly from the said supporting member, a spacer arm attached to and projecting forwardly from the lower end of each bracket, a shaft mounted in the outer end of the said spacer arm, a ground engaging roller supported on the shaft, a support arm having its rear portion connected with the upper part of each bracket and its front portion connected with the wheel shaft, and a lever connected to the tooth supporting member and having its outer end adjustably connected to the support arm for maintaining the said teeth in selectively adjusted position.

2. An attachment for a lawn mower having a transversely extending cross bar mounted thereon, comprising a pair of vertically depending brackets secured to the end portions of the cross bar, a tooth carrying member connected to the lower end portions of the brackets and extending therebetween, a spacer arm fastened to the lower end portion of each bracket and extending forwardly thereof, the said arm having a longitudinally elongated slot in its forward portion, a shaft extended transversely through the slot of the said arm and longitudinally adjustable thereon, a rotary ground engaging wheel mounted on the shaft, an arcuate support arm having its front end connected with the said wheel shaft and its rear end adjustably connected with the upper portion of the bracket, the said support arm having an elongated slot at its intermediate portion, a lever having its inner end attached to an end portion of the tooth supporting member and its outer end adjustably connected with the slotted portion of the support arm, and a plurality of teeth attached to and projecting forwardly from the tooth supporting member selectively adjustable to various angular positions with reference to the spacer arms upon angular adjustment of the said levers.

SAMUEL GARGIULE.
FRANK TARANTA.